United States Patent [19]
Madani

[11] Patent Number: 5,346,592
[45] Date of Patent: Sep. 13, 1994

[54] COMBINED WATER PURIFICATION AND POWER OF GENERATING PLANT

[76] Inventor: Anas A. Madani, P.O. Box 8004, Jeddah, Saudi Arabia

[21] Appl. No.: 105,006

[22] Filed: Aug. 11, 1993

[51] Int. Cl.$^5$ .............................................. C02F 1/10
[52] U.S. Cl. ........................................ 202/176; 60/648; 60/677; 60/679; 203/10; 203/88; 203/DIG. 20; 202/178; 202/182; 202/197; 202/234; 159/46
[58] Field of Search ................ 60/648, 653, 677, 679, 60/691; 203/10, 88, DIG. 20; 202/176, 178, 182, 197, 234; 159/46

[56] References Cited
U.S. PATENT DOCUMENTS

| | | | |
|---|---|---|---|
| 3,352,107 | 11/1967 | Blaskowski | 60/648 |
| 3,476,653 | 11/1969 | Doland | 203/DIG. 20 |
| 4,094,747 | 6/1978 | Pfenninger | 60/648 |

*Primary Examiner*—Ira S. Lazarus
*Assistant Examiner*—L. Heyman
*Attorney, Agent, or Firm*—Craine & Jackson

[57] ABSTRACT

A combined water purification and power generating plant is disclosed having special features designed to maximize the cycle thermal efficiency and salt recovery, with little or no concentrated brine produced therefrom. Using the plant, a volume of salt water is delivered to a plurality of indirect and direct contact feed heaters. Within the direct contact heaters, the salt water is heated and diluted by condensation therein by superheated steam delivered thereto. Any alkaline salts having reverse solubility characteristics particulate and are filtered therefrom. From the last direct contact feed heater, the diluted salt water is delivered to a plurality of high pressure, high temperature evaporators arranged in a series which are used to further heat, evaporate and filter the salt water in multiple stages thereby improving the plant's efficiency. A steam heater is used to super-heat a steam which delivered to various areas of the plant to heat and evaporate the salt water. High and low pressure steam turbines are also provide which utilize the steam to generate electrical power. The turbines are also arranged so that the exhaust steam therefrom may be used to heat the salt water in the feed heaters and then condensed into fresh water. An optional expansion tank is also provided for additional evaporation of the concentrated brine from the last evaporator.

16 Claims, 1 Drawing Sheet

COMBINED WATER PURIFICATION AND POWER OF GENERATING PLANT

BACKGROUND OF THE INVENTION

1. Field Of the Invention:

This invention relates generally to a combined sea water desalinization and electrical power generation system and, more particularly, such a system which operates with greater efficiency and high salts recovery, with little or no discharge of concentrated brine material.

2. Description of the Related Art:

The need for economical desalination plant has grown as reliable supplies of fresh water have diminished in traditionally water-short areas of the world and in semi-arid regions experiencing rapid population growth. The major desalination processes use in such plants today can be broadly classified as either thermal or membrane processes.

Thermal processes are based on the distillation of salt water wherein salt water is boiled, and the steam evolved therefrom is collected and condensed into desalinated water. The most widely used thermal process uses multistage flash distillation, also known as MSF, which is based on the principle that water will boil at lower temperatures when it is subjected to lower pressures. Using MSF, heated salt water is fed into a flash chamber in which the pressure is gradually lowered which allows the salt water to boil at lower temperatures. The vapor produced is condensed on tubes that carry fresh, cool salt water into the plant. In the heat-exchange process, steam heats the cooler salt water, while the vapor condenses into desalinated water. The higher concentrated, unevaporated sea water is then delivered to a second chamber maintained at a lower pressure, where the process is repeated. For large desalination plants, a large number of flash chambers may be used.

Most membrane plants are based on reverse osmosis processes wherein saline water is pumped to a pressure above its osmotic pressure. The compressed saline water is ultra-filtered by a semi-permeable membrane which allows water molecules to pass through while preventing passage of salt molecules. Fresh water is then collected from the other side of the membrane.

One major constraint in all desalination plants is undesirable salt formation on various surfaces on the machinery. For example, calcium sulphate salts precipitation, which can not be prevented by pH control, will limit the maximum boiling temperature of sea water to 120 degrees C. This is mainly due to the salt material being deposited on heat transfer surfaces located in the evaporators which increases the resistance for heat transfer. This, in turn, increases the energy requirement for the plant.

Combined desalination and power generation plants, also known as dual purpose plants, are commercially used today. In general, these plants utilize the expanded steam from the power plants' turbines to supply thermal energy used in the desalination process. Currently, research is directed towards improving the temperature limitations of the plants by chemical pre-treatment of the salt water. One alternative approach has been to use direct contact heat transfer equipment which eliminates the need for heat transfer surfaces. With direct contact heat transfer processes, a heat transfer medium, such as hydrocarbon oils, is used to transfer heat to the salt water. Unfortunately, problems with emulsion formation, oil-water separation, and oil degradation have limited the development of these processes.

Another approach to resolving the temperature limitations of these plants was described by Blaskowski in U.S. Pat. No. 3,352,107. In Blaskowski, superheated steam is used as a heat transfer medium in a combined power generating-desalination plant. Unfortunately, the system was not commercially developed due to important thermodynamic and design considerations.

Another desirable goal for most desalination plants is the total recovery of various salts from the sea water. Unfortunately, due to inherent thermal inefficiencies in the plant's designs, recovery of salts from current desalination plants have not be commercially developed.

More efficient dual purpose plants are needed today. In addition, such plants which allow for greater salt recovery and that substantially reduce or eliminate the concentrated brine therefrom, would be highly desirable.

SUMMARY OF THE INVENTION

It is the object of the invention to provide a combined desalination and power generating plant.

It is another object of the present invention to provide such a combined plant which is more energy efficient than currently available combined plants.

It is a further object of the present invention to provide such a plant which provides for salt recovery.

It is a still another object of the present invention to provide such a plant that rejects little or no concentrated brine.

An energy efficient, high recovery water purification, power generating and salt recovery plant is disclosed herein. The plant, which in the preferred embodiment uses sea water as a working medium, operates on an energy efficient regenerative-reheat, thermodynamic cycle. Although in the preferred embodiment, the plant is concerned with desalting sea water, it should be understood that the plant may be adapted to recover fresh water from other contaminated water sources. With such modifications, of course, the material recovered from the plant will vary with the source of the contaminated water.

The plant includes special features designed to maximize cycle thermal efficiency. In the plant a volume of sea water is gradually heated by condensation of superheated steam extracted from turbines at different conditions. During treatment, the solubility of the salt changes so that filters may be used to remove any particulate material therefrom. The salt water is diluted over a series of steps and then delivered to multi-stage evaporators which are used to evaporate the water. In the preferred embodiment, a multi-stage evaporator scheme is used to reduce the deficiencies resulting from boiling point elevation, to reduce steam pressure losses, to reduce liquid entrainment, to reduce equipment size, and to improve salt recovery. Sensible heat and heat of vaporization are provided in the evaporators by direct contact with super-heated steam. The super-heated steam used in each evaporator is compressed to compensate for pressure losses in steam ducts and any other pressure losses result from contact with the salt water or brine located therein. The steam and water vapor produced from each evaporator is passed through a demister (a gas-liquid separation device commonly used in thermal desalination processes) to remove any entrained liquid. From the demister, the steam is delivered to the steam heater where it is super-heated for use in the regenerative-reheat cycle. Part of the super-heated steam from the steam heater is also recycled through the evaporators. For initial start up, an auxiliary boiler may be used to produce an initial steam flow to the steam heater and the evaporators. In addition, the steam from the turbines of the power generation cycle is delivered to a condenser which uses the sea water pumped into the plant as a coolant to produce fresh water.

In the evaporators, the salt water is processed to produce concentrated brine. In the last evaporator, the brine is at high temperature and pressure with a salt concentration over 10 times the sea water entering the plant. In one embodiment, the brine is delivered to an expansion tank wherein the pressure is reduced which allows up to 60% of the water to be removed by evaporation. Conduits are provided for carrying the steam produced from the expansion tank to other parts of the plant, such as the direct contact feed heaters, where it is used to pre-heat the sea water.

After treatment in the expansion tank, the brine is then delivered to solar ponds from which the remaining water is slowly evaporated. Alternatively, the brine may be brought into direct contact with the steam heater's flue gas for rapid evaporation. In this manner, little or no concentrated brine produced by the plant is rejected into the environment.

Various conduits are also provided to deliver the super-heat steam between the steam heater and other areas in the plant to supply the sensible heat and the heat of vaporization to the treated sea water.

The thermal efficiency of this plant is within 1 to 2% of a typical regenerative-reheat cycle which means lower energy requirements for the desalination process. By using super-heated steam in direct contact equipment, the need for heat transfer surfaces is eliminated, thereby reducing the problems associated therewith, such as corrosion and scale formation. To handle the high temperature and pressure, the vessels used in the plant may be made of enforced, lined concrete can be utilized which reduces the current capital cost of the expensive alloys currently used in thermal desalination plants. In addition to the energy and capital cost savings, salt recovery is greatly improved for commercialization.

DESCRIPTION OF THE PREFERRED EMBODIMENT(S)

Figure 1:
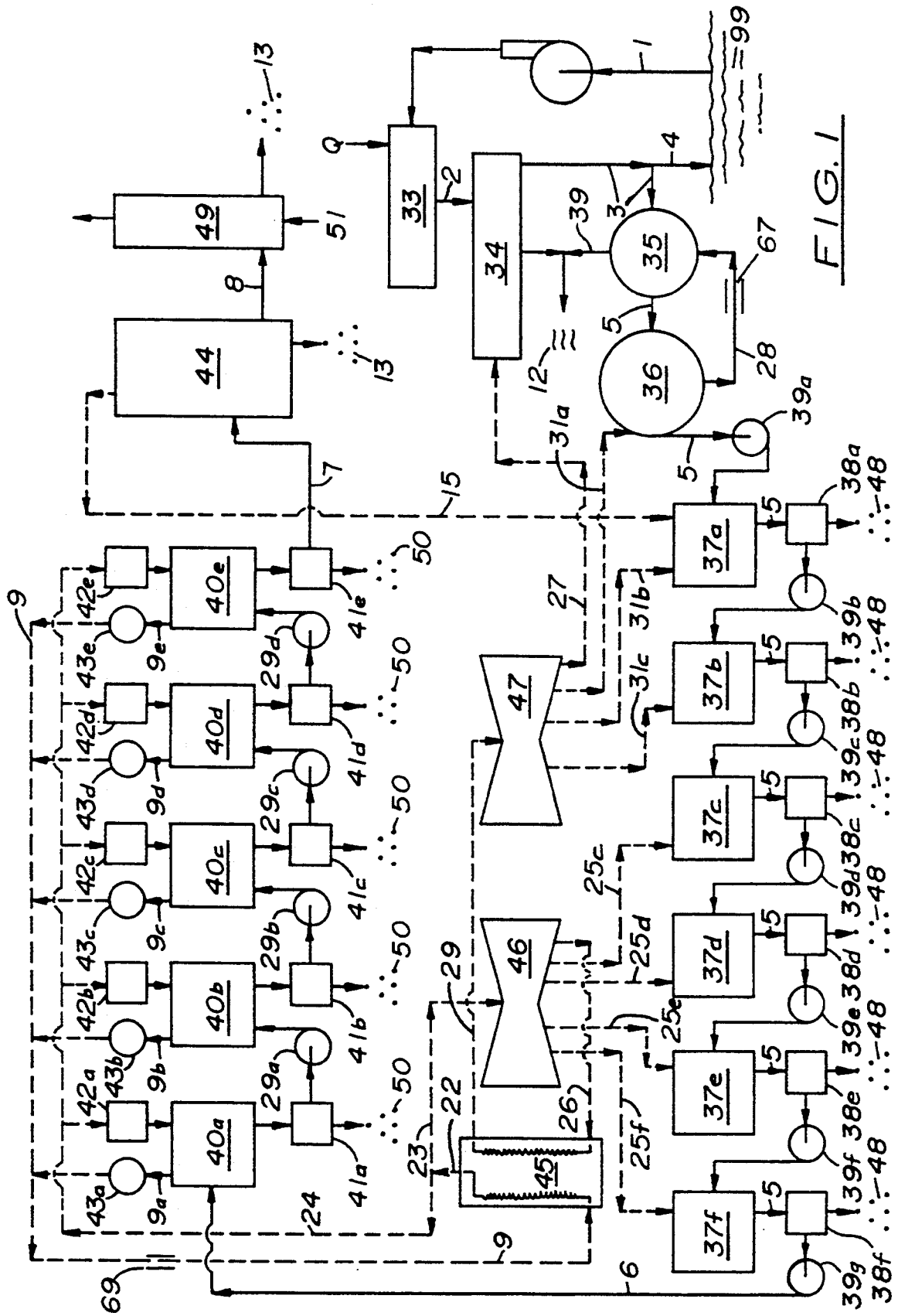
FIG. 1 represent a flow diagram for the plant.

Referring now to the drawing, wherein like reference characters designate like elements, there is shown in FIG. 1, a combined desalination and power generating plant, designated generally 10.

Sea water 1 is pumped by a typical intake pumping system 32 into a water treatment tank 33 where it undergoes chlorine or ultraviolet treatment, designated Q. The treated sea water 2 is then transported by a conduit to a condenser 34 where it is used to remove the heat of condensation from the expanded exhaust steam 27 delivered from the low pressure turbine 47. The condenser 34 is an indirect contact heat exchanger wherein the exhaust steam 27 is at pressure below atmospheric.

From the condenser 34, the warm sea water 3 is delivered to an indirect contact heat exchanger 35 which heats it using the condensed steam 28 from the indirect contact feed heater 36 to produce heated sea water 5. The excessive treated sea water 4 used for cooling is delivered back to the sea 99. The heated salt water 5 is then delivered to the indirect contact feed heater 36 where it is further heated by bleeded steam 31(a) from the low pressure turbine 47 described further below. The indirect contact feed heater 36 is an indirect contact heater rather than a direct contact heater because the bleeded steam 31(a) from the low pressure turbine 47 is below atmospheric pressure.

From the indirect contact feed heater 36, the heated salt water 5 is delivered to a plurality of multi-stage direct contact feed heaters 37(a)–(f) which are used to gradually increase the temperature of the heated sea water 5 to a temperature found in the first evaporator 40(a). In the preferred embodiment, there are six direct contact feed heaters 37(a)–(f). Connected to each direct contact feed heater 37(a)–(f) is a pump 38(a)–(f), respectively, which is used to pump the salt water 5 to the pressure of the subsequent direct contact feed heater. Once delivered to the first direct contact feed heater 37(a), the salt water 5 is heated by condensation from the expanded steam 15 produced from the expansion tank 44 and the bleeded steam 31(b) from the low pressure turbine 47. Inside the first contact feed heater 37(a), the combined steams 15 and 31(b) are condensed directly on the salt water 5 so that no heat transfer surface is needed. Similar methods are used to heat the salt water 5 in the other direct contact feed heaters 37(b)–(f). Either a spray feed heater such as the employed in power plant, or bubbling steam into heated salt water 5 or any direct contact apparatus can be used as the direct contact feed heaters 37(a)–(f).

Connected between each direct contact feed heater 37(a)–(f) is a filter 38(a)–(f), respectively, which is used to filter the exiting stream of salt water 5 from each direct contact feed heater 37 to recover any insoluble salts 48 therefrom. While being heated in the direct contact feed heaters 37(a)–(f), the salt water 5 is gradually diluted. As a result, alkaline salts having inverse solubilities, such as Magnesium Hydroxide, Magnesium Chloride, and Calcium Carbonate, may be recovered using the filters 38(a)–(f). Because the salt water 5 is being diluted in the process, other salts, such as Calcium Sulfate, are not expected to precipitate. Since various magnesium salts are found in sea water 1, the plant 10 may be used for magnesium production. Enhancing the precipitation of $Mg(OH)_2$ salt over other alkaline salts from the heated salt water 5 can be achieved by adjusting the pH and/or by sludge recirculation through the direct contact feed heaters 37(a)–(f).

After being filtered by the last filter 38(f), the heated, dilute salt water 5, now referred to as salt water 6, is then pumped using pump 39(g) to five multi-stages evaporators 40(a)–(e). The evaporators 40(a)–(e) are used to evaporate the salt water 6 to produce concentrated brine 8. The salt water 6 is delivered to the first evaporator 40(a) having a temperature and pressure near the saturation conditions. For the embodiment disclosed herein, the concentrated salt water 6 exiting from the last evaporator 40(e) is at a pressure of 165 bar and a temperature of 372 C. and has a saturated NaCl concentration of about 417,000 ppm. Although the number of evaporators may be varied for special plants, with plant 10 over 45% of the salt water 6 is evaporated in the first evaporator 40(a), about 67% of the salt water 6 delivered from the first evaporator 40(a) is evaporated in the second evaporator 40(b), about 40% of the salt water 6 delivered from the second evaporator 40(b) is evaporated in the third evaporator 40(c), about 28% of the salt water 6 delivered from the third evaporator 40(c) is evaporated in the fourth evaporator 40(d), and about 30% of the salt water 6 delivered from the fourth evaporator is evaporated in the fifth evaporator 40(e). The heat of vaporization and the sensible heat needed in each evaporator 40(a)-(e) is supplied by the super-heated steam 24 from the steam heater 45. The super-heated steam 24 is compressed by fans or compressors 42(a)-(e) located at the entrance of each evaporator 40(a)-(e), respectively, to compensate for pressure losses in steam ducts and other losses resulting from contact with the salt water 6.

The exiting stream of steam and water vapor 8(a)-8(g) from the evaporators 40(a)-(e), respectively, are combined to form a combined stream of steam, designated 8. Each exiting stream 8(a)-(g) is passed through a demister 43(a)-(g), respectively, to remove any entrained liquid or solid therefrom. The combined stream of steam 8 is then delivered to the fuel steam heater 45 where it is super-heated.

When the combined stream of steam 8 is super-heated to produce a stream of super-heated steam 22, it is then divided into two streams of super-heated steam, 23 and 24. One stream 23 is delivered to a high pressure turbine 46 while the second stream 24 is delivered back to the evaporators 40(a)-(e) where it is used to heat and evaporate the salt water 6 contained therein. After being delivered to the high pressure turbine 46, the bleeding streams of steam 25(c)-(f) therefrom are used to heat the salt water 5 in the third, fourth, fifth, and sixth feed heaters 37(c)-(f), respectively, at the corresponding thermodynamic state (allowing 1 degree C. driving force). The expanded exhaust steam 26 from the high pressure turbine 46 is delivered back to the steam heater 45 for reheating at constant pressure. The stream of reheated steam 29 from the steam heater 45 is then delivered to the low pressure turbine 47. As mentioned above, the salt water 5 is heated in the indirect contact feed heater, 36, and the first and second direct contact feed heaters 37(a),(b) by bleeding steam 31(a), (b), and (c), respectively, at a corresponding thermodynamic state (allowing 1 degree C. driving force). The power produced from the streams of steams 23, 29, in the turbines 46, 47, respectively can be converted into electrical power by generators (not shown). Other combination of turbines can be adopted.

For initial start-up of the plant, an auxiliary boiler (not shown) is used to provide the super-heated steam 24 needed for the evaporators 40(a)-(e) and for preheating the salt water 1. In all of the evaporators 40(a)-(e), the super-heated steam 24 and concentrated salt water 6 contained therein are in direct contact without any heat transfer surface. Spray columns or super heated steam bubbling through the salt water 6 or any direct contact method can be employed. To account for pressure losses in the evaporators 40(a)-(e), compressors or circulation fans 42(a)-(e) may be used at the entrance of the super-heated steam 24 to each evaporator 40(a)-(e). To account for salt water pressure losses, a pump 29(a)-(d) is used between each evaporator 40(a)-(d), respectively.

As evaporation takes place in the evaporators 40(a)-(e), Calcium Sulphate salts 50 are expected to precipitate due to their increased concentration in the salt water 6. These salts 50 can be collected by a medium filter 41(a)-(e) after each evaporator 40(a)-(e), respectively. The concentrated salt water, now referred to as brine 8, exits from the last evaporator 40(e) is delivered to an expansion tank 44 which has a pressure equal to the pressure of the first direct contact feed heater 37(a). As a result of this lower pressure, over 60% of the brine 8 is further evaporated thereby allowing the NaCl 13 to precipitate and be collected therefrom. The remaining fluid in the brine 8 may be delivered to a salt recovery tank 49 where it is brought in direct contact with the flue gas 51 from the steam heater 45 for total recovery of NaCl 13. Thus, concentrated brine 8 is prevented from being rejected into the environment.

The expanded exhaust steam 27 from the low pressure turbine 47 is condensed in the condenser 34. In the preferred embodiment, exhaust steam 27 is combined with the condensed steam 39 from the heat exchanger 35. From the combined streams 27, 39 fresh water may be produced from the plant 10. By adding the steam 15 produced from the expansion tank 44, an overall water recovery above 90% can be realized.

In the plant 10, a water conduit system 67 and a steam conduit system 69 are used to transport the contaminated water and the steam and super-heated steam, respectively, between the various components discussed above.

In summary, a combined desalination and power generating plant 10 is provided which is more energy efficient than currently available combined plants. Plant 10 also provides for high salt recovery with little or no concentrated brine 8 rejected into the environment.

In compliance with the statute, the invention has been described in language more or less specific as to structural features. It should be understood, however, that the invention is not limited to the specific features shown since the means and construction shown comprises the preferred forms of putting the invention into effect. The invention is, therefore, claimed in any of its forms or modifications within the legitimate and valid scope of the amended claims, appropriately interpreted in accordance with the doctrine of equivalents.

I claim:

1. A water purification and power generating plant which operates on a regenerative-reheat cycle comprising:
   a. a steam heater capable of super-heating steam;
   b. a water treatment tank capable of receiving a volume of contaminated water to be purified;
   c. a heat exchanger capable of heating said contaminated water delivered from said water treatment tank;
   d. an indirect contact feed heater capable of receiving and further heating said contaminated water delivered from said heat exchanger;
   e. multi-stage direct contact feed heaters, said multi-stage direct contact feed heaters including a plurality of direct contact feed heaters arranged in a series arrangement capable of gradually heating and diluting said contaminated water delivered thereto from said indirect contact feed heater, each said direct contact feed heater being capable of receiving said super-heated steam from said steam heater to heat and to dilute said contaminated water contained therein, each said direct contact feed heater having a pumping means capable of forcibly moving and elevating the pressure of said contaminated water from one said direct contact feed heater to an adjacent direct contact feed heater located downstream therefrom, each said direct contact feed heater also including a filtering means capable of removing particulating solutes from said contaminated water contained therein;

f. multi-stage evaporators capable of evaporating said contaminated water delivered from last said direct contact feed heater, said multi-stage evaporators including a plurality of evaporator tanks arranged in a series arrangement capable of receiving said contaminated water and super-heated steam from said steam heater to supply heat of vaporization needed to evaporate said contaminated water contained therein, each said evaporator tank also connected to a filtering means capable of removing any particulating solutes from said contaminated water contained therein;

g. a demister connected to one of said evaporator tanks capable of removing any entrained liquid or solid in said steam and water vapor exiting therefrom;

h. a means for delivering said steam and water vapor produced by evaporation of said contaminated water inside each said evaporation tank to said steam heater for super-heating;

i. a combination power generating and steam moving means capable of producing electrical power and capable of moving said super-heated steam through the plant, said combination power generating and steam moving means including a turbine system which operates on a regenerative-reheat cycle;

j. a condenser means capable of receiving said exhaust steam from said turbine system and condensing it into portable water, said condenser being disposed between said water treatment tank and said heat exchanger so that said contaminated water delivered from said water treatment tank may be used as a coolant medium in said condenser means;

k. a water conduit means capable of transporting said contaminated water in said plant, and;

l. a steam conduit means capable of transporting said super-heated steam within said plant.

2. A water purification and power generating plant as recited in claim 1, further comprising an expansion tank located downstream from said last evaporator tank capable of receiving said concentrated contaminated water therefrom, said expansion tank being capable of reducing the pressure exerted on said concentrated contaminated water thereby allowing further evaporation thereof.

3. A water purification and power generating plant as recited in claim 2, further comprising a filter means connected to said expansion tank capable of removing any particulating solutes from said concentrated contaminated water.

4. A water purification and power generating plant as recited in claim 3, further comprising a salt recovery tank capable of receiving said concentrated contaminated water from said expansion tank, said salt recovery tank including means for direct contact of said concentrated contaminated water contact with the flue gases from said steam-heater for further evaporation of said concentrated contaminated water.

5. A water purification and power generating plant as recited in claim 1, wherein said turbine system includes at least one high pressure turbine and at least one low pressure turbine.

6. A water purification and power generating plant as recited in claim 5, wherein a portion of said expanded steam from said high pressure turbine is delivered to at least one said direct contact feed heater having said contaminated water contained therein at a pressure equal to or less than said expanded steam from said high pressure turbine.

7. A water purification and power generating plant as recited in claim 5, wherein a portion of said expanded steam from said low pressure turbine is delivered to at least one said direct contact feed heater having said contaminated water contained therein at a pressure equal to or less than said expanded steam from said low pressure turbine.

8. A water purification and power generating plant as recited in claim 7, wherein said contaminated water is salt water.

9. A water purification and power generating plant as recited in 8, wherein said particulating solutes is a solute selected from the group consisting of Sodium Chloride, Magnesium Hydroxide, Magnesium Chloride, and Calcium Sulfate.

10. A salt water purification and power generating plant which operates on a regenerative-reheat cycle comprising:

a. a steam heater capable of super-heating steam;

b. a water treatment tank capable of receiving a volume of salt water to be purified;

c. a heat exchanger capable of heating said salt water delivered from said water treatment tank;

d. an indirect contact feed heater capable of receiving and further heating said salt water delivered from said heat exchanger;

e. multi-stage direct contact feed heaters, said multi-stage direct contact feed heaters including a plurality of direct contact feed heaters arranged in a series arrangement capable of gradually heating and diluting said contaminated water delivered thereto from said indirect contact feed heater, each said direct contact feed heater being capable of receiving said super-heated steam from said steam heater to heat and to dilute said salt water contained therein, each said direct contact feed heater having a pumping means capable of forcibly moving and elevating the pressure of said salt water from one said direct contact feed heater to an adjacent direct contact feed heater located downstream therefrom, each said direct contact feed heater also including a filtering means capable of removing any particulating solutes from said salt water dissolved therein;

f. multi-stage evaporators capable of evaporating said salt water delivered from last said direct contact feed heater, said multi-stage evaporators including a plurality of evaporator tanks arranged in a series arrangement capable of receiving said salt water and super-heated steam from said steam heater to supply heat of vaporization needed to evaporate said salt water contained therein, each said evaporator tank also connected to a filtering means capable of removing particulating solutes from said salt water;

g. a demister connected to one of said evaporator tanks capable of removing any entrained liquid or solid in said steam and water vapor exiting therefrom;

h. a means for delivering said steam and water vapor produced by evaporation of said salt water inside each said evaporation tank to said steam heater for super-heating;

i. a combination power generating and steam moving means capable of producing electrical power and capable of moving said super-heated steam through the plant, said combination power generating and steam moving means including a turbine system which operates on a regenerative-reheat cycle;

j. a condenser means capable of receiving said exhaust steam from said turbine system and condensing it into portable water, said condenser being disposed between said water treatment tank and said heat exchanger so that said salt water delivered from said water treatment tank may be used as a coolant medium in said condenser means;

k. an expansion tank located downstream from said last evaporator tank capable of receiving said concentrated salt water therefrom, said expansion tank being capable of reducing the vapor pressure exerted on said concentrated salt water thereby allowing further evaporation thereof;

l. a water conduit means capable of transporting said salt water within said plant, and;

m. a steam conduit means capable of transporting said super-heated steam in said plant.

11. A salt water purification and power generating plant as recited in claim 10, further comprising means for delivering said concentrated salt water from said expansion tank for direct contact with the flue gases from said steam-heater for still further evaporation thereof.

12. A salt water purification and power generating plant as recited in claim 10, wherein said turbine system includes at least one high pressure turbine and at least one low pressure turbine.

13. A salt water purification and power generating plant as recited in claim 12, wherein a portion of said expanded steam from said high pressure turbine is delivered to at least one said direct contact feed heater having said salt water contained therein at a pressure equal to or less than said expanded steam from said high pressure turbine.

14. A salt water purification and power generating plant as recited in claim 12, wherein a portion of said expanded steam from said low pressure turbine is delivered to at least one said direct contact feed heater having said salt water contained therein at a pressure equal to or less than said expanded steam from said low pressure turbine.

15. A salt water purification and power generating plant as recited in claim 12, wherein said salt water is sea water.

16. A salt water purification and power generating plant as recited in claim 15, wherein said particulating solutes is a salt selected from the group consisting of Sodium Chloride, Magnesium Hydroxide, Magnesium Chloride, and Calcium Sulfate.

* * * * *